(12) United States Patent
Han

(10) Patent No.: US 9,310,639 B2
(45) Date of Patent: Apr. 12, 2016

(54) LIQUID CRYSTAL DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Shuai Han, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 32 days.

(21) Appl. No.: 14/537,222

(22) Filed: Nov. 10, 2014

(65) Prior Publication Data
US 2015/0370124 A1 Dec. 24, 2015

(30) Foreign Application Priority Data

Jun. 19, 2014 (CN) .......................... 2014 1 0275991

(51) Int. Cl.
*G02F 1/1335* (2006.01)
*G02F 1/1333* (2006.01)
*G02F 1/1343* (2006.01)
*F21V 8/00* (2006.01)

(52) U.S. Cl.
CPC ........ *G02F 1/133514* (2013.01); *G02B 6/0053* (2013.01); *G02F 1/13338* (2013.01); *G02F 1/13439* (2013.01); *G02F 1/133555* (2013.01)

(58) Field of Classification Search
CPC .......... G02F 1/13338; G02F 1/133514; G02F 2001/13312; G02F 1/133512; G02F 1/133516; G06F 3/0413; G06F 3/045; G06F 3/044
USPC ..................................... 349/12, 106
See application file for complete search history.

(56) References Cited

U.S. PATENT DOCUMENTS

| 8,624,846 B2* | 1/2014 | Fukunaga | ........... G02F 1/13338 345/156 |
| 2005/0041412 A1* | 2/2005 | Lin | ...................... G02B 6/0026 362/632 |

* cited by examiner

*Primary Examiner* — Mike Qi
(74) *Attorney, Agent, or Firm* — Nath, Goldberg & Meyer; Joshua B. Goldberg

(57) ABSTRACT

The present invention provides a liquid crystal display panel comprising an array substrate, an opposite substrate and a backlight module, wherein the liquid crystal display panel includes a light-filtering layer arranged between the backlight module and the array substrate, and the light-filtering layer includes a plurality of light-filtering sub-units corresponding to sub-pixels on the array substrate in a one-to-one manner, every three of the light-filtering sub-units form one light-filtering unit, in which the three light-filtering sub-units are capable of filtering out red, green and blue lights emitted by the backlight module respectively. The brightness of the complementary color light obtained after any one of red light, green light and blue light is filtered out from white light is larger than that of light of a single color, and thus the liquid crystal display panel provided by the present invention has relatively high light transmittance.

19 Claims, 2 Drawing Sheets

LIQUID CRYSTAL DISPLAY PANEL

FIELD OF THE INVENTION

The present invention relates to the field of display technology, and particularly relates to a liquid crystal display panel.

BACKGROUND OF THE INVENTION

To realize color display, a liquid crystal display panel generally comprises an array substrate and a color filter substrate aligned with the array substrate. The color filter substrate is provided with pixel units, each of which includes color resisting blocks of three colors, namely red color resisting block, green color resisting block and blue color resisting block, and color resisting blocks of the respective colors correspond to sub-pixel units on the array substrate. Light from a backlight source becomes red, green and blue lights respectively, after passing through the red color resisting blocks, the green color resisting blocks and the blue color resisting blocks. Display of various colors can be implemented by mixing lights with different intensities passing through the color resisting blocks of the three colors.

Although color resisting blocks of each color allow passage of color light corresponding thereto, the color resisting blocks themselves can absorb part of light rays emitted by the backlight source, so that light transmittance of the liquid crystal display is relatively low.

Thus, how to increase light transmittance of the liquid crystal display has become an urgent technical problem to be solved in the art.

SUMMARY OF THE INVENTION

An object of the present invention is to provide a liquid crystal display which has relatively high light transmittance.

To achieve the above object, there is provided a liquid crystal display panel, which comprises an array substrate, an opposite substrate and a backlight module, wherein the liquid crystal display panel includes a light-filtering layer arranged between the backlight module and the array substrate, and the light-filtering layer includes a plurality of light-filtering sub-units corresponding in a one-to-one manner to sub-pixels on the array substrate, every three of the light-filtering sub-units form one light-filtering unit, in which the three light-filtering sub-units are capable of filtering out red light, green light and blue light from light emitted by the backlight module, respectively.

Preferably, the light-filtering layer includes a first transflective layer, a second transflective layer and a third transflective layer which are laminated one by one. In this case, the first transflective layer includes first transflective lens films and transparent films, the second transflective layer includes second transflective lens films and transparent films, and the third transflective layer includes third transflective lens films and transparent films. Based on color light to be filtered out by each light-filtering sub-unit, one of the first to third transflective lens films is arranged in an area corresponding to respective light-filtering sub-unit, such that color lights obtained after passing through the light-filtering sub-units are complementary color lights to red, green and blue lights, respectively.

The first transflective lens films are capable of reflecting light of a first color from red, green and blue and transmitting lights of other colors than the light of the first color, the second transflective lens films are capable of reflecting light of a second color from red, green and blue and transmitting lights of other colors than the second color, and the third transflective lens films are capable of reflecting light of a third color from red, green and blue and transmitting lights of other colors than the third color.

Preferably, the backlight module includes a brightness enhancement layer arranged between the backlight module and the light-filtering layer, a light-emitting member of the backlight module is arranged on one side of the backlight module; and the brightness enhancement layer includes a plurality of total reflection prisms, bottom surfaces of which are arranged to be parallel to a bottom surface of the array substrate, and vertex angles of which protrude towards the backlight module.

Preferably, the brightness enhancement layer further includes a light-pervious substrate arranged to be parallel to the bottom surface of the array substrate, and the bottom surface of each total reflection prism is arranged on the light-pervious substrate.

Preferably, a side surface of the total reflection prism facing the light-emitting member of the backlight module is an incident surface, a side surface connecting the incident surface and the bottom surface is a reflective surface, and the reflective surface of the total reflection prism is a curved surface protruding towards the outside of the total reflection prism.

Preferably, the liquid crystal display panel comprises a touch unit, at least part of which is arranged on the opposite substrate.

Preferably, the touch unit includes a touch substrate arranged above the opposite substrate, a plurality of first touch electrodes are arranged on the touch substrate, a plurality of second touch electrodes are arranged on the opposite substrate, and the plurality of first touch electrodes and the plurality of second touch electrodes are interlaced with each other.

Preferably, the number of the first touch electrodes is the same as the number of gate lines on the array substrate and positions of the first touch electrodes correspond to positions of the gate lines; and the number of the second touch electrodes is the same as the number of data lines on the array substrate and positions of the second touch electrodes correspond to positions of the data lines.

Preferably, the first touch electrodes and the second touch electrodes are made of non-transparent metal material.

Preferably, the first touch electrodes and the second touch electrodes are made of transparent electrode material.

As the brightness of the complementary color light obtained after red light, green light or blue light is filtered out from white light is larger than that of light of a single color (for example, the brightness of the complementary color light to red light is larger than that of red light generated after white light passes through a red color resisting block, the brightness of the complementary color light to green light is larger than that of green light generated after white light passes through a green color resisting block, and the brightness of the complementary color light to blue light is also larger than that of blue light generated after white light passes through a blue color resisting block), the liquid crystal display panel provided by the present invention has relatively high light transmittance.

In the liquid crystal display panel provided by the present invention, there is no need to provide color resisting blocks of various colors on the opposite substrate, and therefore, the liquid crystal display panel provided by the present invention is easy to manufacture.

BRIEF DESCRIPTION OF THE DRAWINGS

The accompanying drawings are intended to provide further understanding of the present invention, constitute part of the description, and are used for explaining the present invention together with the following specific embodiments, but not limit the present invention. In the drawings.

REFERENCE NUMERALS

Figure 1:
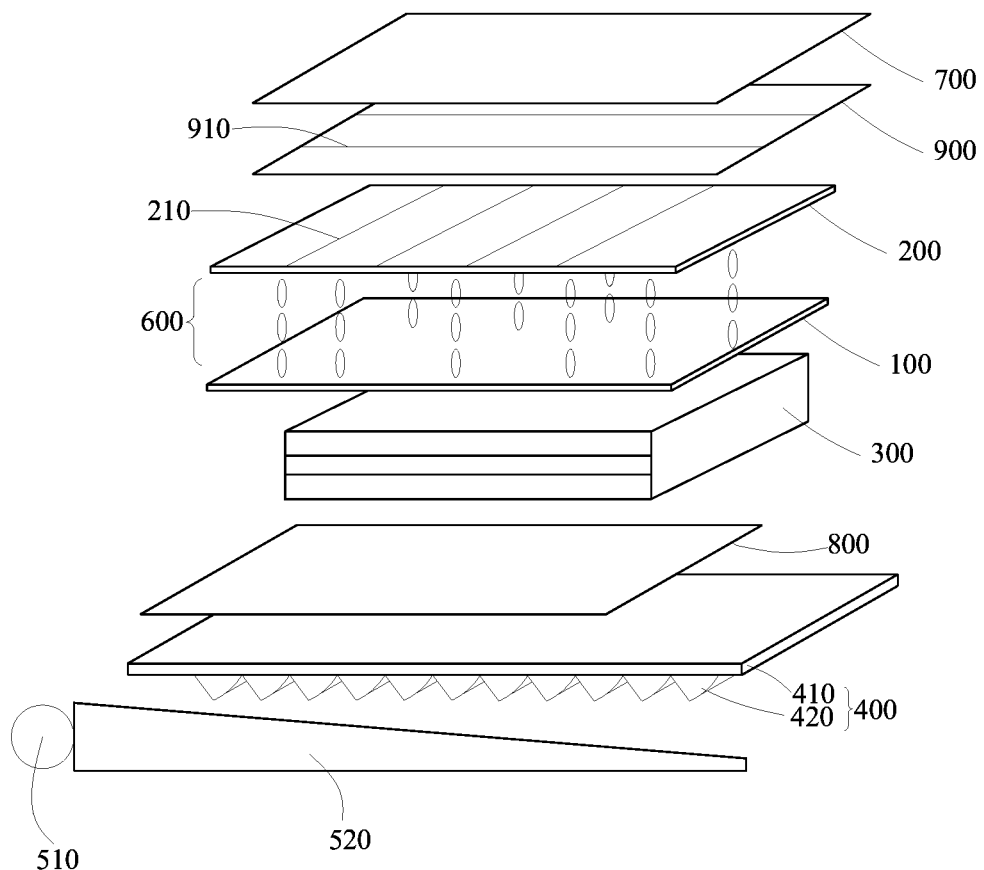
FIG. 1 is a schematic exploded perspective view of a liquid crystal display panel provided by the present invention.

100: array substrate
200: opposite substrate
210: second touch electrode
300: light-filtering layer
301: first transflective layer
302: second transflective layer
303: third transflective layer
311: first transflective lens film
312: second transflective lens film
313: third transflective lens film
400: brightness enhancement layer
410: light-pervious substrate
420: total reflection prism
510: light-emitting member
520: light guide plate
600: liquid crystal layer
700: upper polarizing filter
800: lower polarizing filter
900: touch substrate
910: first touch electrode
320: transparent film

DETAILED DESCRIPTION OF THE EMBODIMENTS

Specific embodiments of the present invention are described below in detail in conjunction with the accompanying drawings. It should be understood that the specific embodiments described herein are only used for illustrating and explaining the present invention, rather than limiting the present invention.

Figure 2:
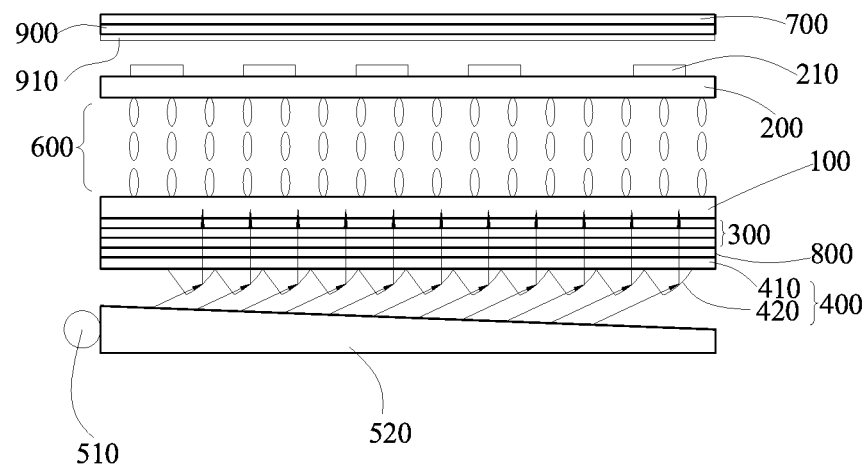
FIG. 2 is a schematic sectional view of a liquid crystal display panel provided by the present invention.

As shown in FIGS. 1 and 2, the present invention provides a liquid crystal display panel, which comprises an array substrate 100, an opposite substrate (i.e., a substrate for being aligned with the array substrate 100 so as to forming a cell) 200 and a backlight module. The liquid crystal display panel further comprises a light-filtering layer 300 arranged between the backlight module and the array substrate 100, and the filter layer includes a plurality of light-filtering sub-units corresponding in a one-to-one manner to sub-pixels on the array substrate. Every three of the light-filtering sub-units form one light-filtering unit (see FIG. 3; described below in detail). In one said light-filtering unit, the three light-filtering sub-units are capable of filtering out red light, green light and blue light from light emitted by the backlight module, respectively.

It is well known to a person skilled in the art that three adjacent sub-pixels of different colors form one pixel unit. In the liquid crystal display panel provided by the present invention, one light-filtering unit corresponds to one pixel unit, and one light-filtering sub-unit corresponds to one sub-pixel. In one light-filtering unit, a first light-filtering sub-unit can filter out red light in white light, a second light-filtering sub-unit can filter out green light in white light, and a third light-filtering sub-unit can filter out blue light in white light.

After white light emitted by a light-emitting member 510 of the backlight module passes through the light-filtering sub-units of the light-filtering layer 300, color light corresponding to each light-filtering sub-unit, i.e., red light, green light or blue light in white light, is filtered out. According to the principle of subtractive three primaries, color lights complementary to red light, green light and blue light, i.e., cyan light, magenta light and yellow light are obtained, respectively. The obtained complementary color lights pass through the transparent array substrate and enter into a liquid crystal layer 600. By adjusting the degree of the rotation angle of liquid crystals in an area corresponding to each light-filtering sub-unit, the intensity of light transmitted through each sub-pixel can be different, so that a color needed by each pixel unit can be obtained by mixing lights transmitted through three sub-pixels in the pixel unit.

The brightness of the complementary color light obtained after red light, green light or blue light is respectively filtered out from white light is larger than that of light of a single color (for example, the brightness of the complementary color light to red light is larger than that of red light generated after white light passes through a red color resisting block, the brightness of the complementary color light to green light is larger than that of green light generated after white light passes through a green color resisting block, and the brightness of the complementary color light to blue light is larger than that of blue light generated after white light passes through a blue color resisting block). Thus, the liquid crystal display panel provided by the present invention has relatively high light transmittance.

In the liquid crystal display panel provided by the present invention, there is no need to provide color resisting blocks of various colors on the opposite substrate, and therefore, the liquid crystal display panel provided by the present invention is easy to manufacture.

In the present invention, the specific structure of the light-filtering layer is not specifically defined, as long as one of red, green and blue lights in white light can be filtered out for sub-pixels of a different color.

Figure 3:
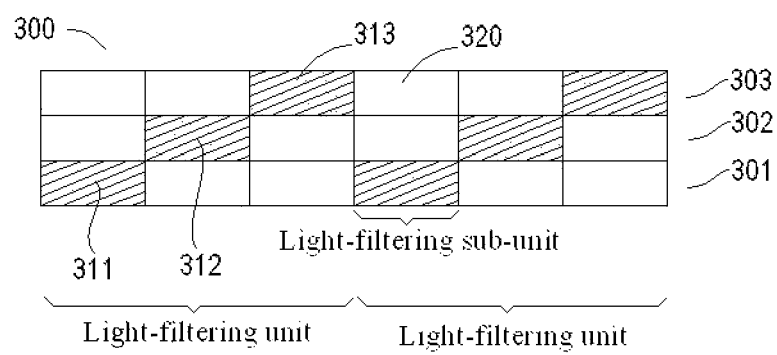
FIG. 3 is a schematic sectional view of a light-filtering layer in a liquid crystal display panel provided by the present invention.

For example, as shown in FIG. 3, as a preferred embodiment of the present invention, the light-filtering layer 300 may include first to third transflective layers 301, 302 and 303 laminated one by one. The first transflective layer 301 includes first transflective lens films 311 and transparent films 320. The second transflective layer 302 includes second transflective lens films 312 and transparent films 320. The third transflective layer 303 includes third transflective lens films 313 and transparent films 320. The first transflective lens films 311 are capable of reflecting light of a first color of red, green and blue and transmitting lights of other colors than the first color, the second transflective lens films 312 are capable of reflecting light of a second color of red, green and blue and transmitting lights of other colors than the second color, and the third transflective lens films 313 are capable of reflecting light of a third color of red, green and blue and transmitting lights of other colors than the third color.

For example, the first transflective lens films 311 may be configured to reflect red light, the second transflective lens films 312 may be configured to reflect green light, and the third transflective lens films 313 may be configured to reflect blue light.

In addition, in areas corresponding to the light-filtering sub-units, corresponding transflective lens films are arranged based on color lights to be filtered out by the respective light-filtering sub-units. For example, in an area corresponding to a light-filtering sub-unit which will filter out red light (see, for example, the light-filtering sub-unit at the lower left corner of FIG. 3), a first transflective lens film 311 is arranged in the first transflective layer 301 comprising first transflective lens films 311 and transparent films 320, and transparent films 320 are arranged in both the second transflective layer 302 comprising second transflective lens films 312 and transparent films 320 and the third transflective layer 303 comprising third transflective lens films 313 and transparent films 320. As such, after white light emitted by the backlight module enters the light-filtering sub-unit and is successively transmitted through the three transflective layers 301, 302 and 303, only red light is filtered out, so that the complementary color light (cyan light) needed by the sub-pixel unit corresponding to the light-filtering sub-unit is obtained. Likewise, in an area corresponding to a light-filtering sub-unit which will filter out green light, a second transflective lens film 312 is arranged in the second transflective layer 302, and transparent films 320 are arranged in the other two transflective layers 301 and 303, so that the light having passed through this light-filtering sub-unit is the complementary color light to green light (i.e., magenta light). Likewise, in an area corresponding to a light-filtering sub-unit which will filter out blue light, a third transflective lens film 313 is arranged in the third transflective layer 303, and transparent films 320 are arranged in the other two transflective layers 301 and 302, so that the light having passed through this light-filtering sub-unit is the complementary color light to blue light (i.e., yellow light).

It can thus be seen that, lights ultimately entering into the liquid crystal layer 600 are complementary color lights obtained after red, green and blue lights are filtered out respectively.

In the present invention, the light-filtering layer may be made by photolithographic process, and may also be made by means of transfer printing, printing or the like. For example, the light-filtering layer may be arranged on an incident surface of the array substrate, or may be arranged on an emergent surface of the lower polarizing filter.

In order to further improve light transmittance of the liquid crystal display panel, preferably, the backlight module may include a brightness enhancement layer 400. The brightness enhancement layer 400 is arranged between the backlight module and the light-filtering layer 300. The light-emitting member 510 of the backlight module is arranged on one side of the backlight module. The brightness enhancement layer 400 includes a plurality of total reflection prisms 420. The bottom surface of each total reflection prism 420 is arranged to be parallel to the bottom surface of the array substrate 100, and the vertex angle of the total reflection prism 420 protrudes towards the backlight module. The three side surfaces of the total reflection prism 420 may be named as incident surface, bottom surface and reflective surface, respectively. The so-called bottom surface is the side surface of the total reflection prism opposite to the vertex angle of the total reflection prism, the incident surface of the total reflection prism is the side surface of the total reflection prism facing the light-emitting member of the backlight module (the left side surface of each total reflection prism in FIGS. 1 and 2), and the reflective surface is the side surface connecting the bottom surface and the incident surface of the total reflection prism (the right side surface of each total reflection prism in FIGS. 1 and 2).

It can be easily understood that after most light rays emitted by the light-emitting member 510 of the backlight module are homogenized by a light guide plate 520 to become a surface light source, the light rays may be emitted towards the array substrate 100. Part of light rays emitted by the light-emitting member 510 of the backlight module may not enter the light guide plate, but are emitted to the total reflection prisms, and may be emitted to the array substrate 100 after being totally reflected by the total reflection prisms. The total reflection prisms are transparent, and light rays entering into the interior of the total reflection prisms from therebelow may still be transmitted through the total reflection prisms, so providing the brightness enhancement layer 400 may further increase light transmittance of the liquid crystal display panel.

In the present invention, there is no special limitation on specific manner of arrangement of the total reflection prisms 420 in the brightness enhancement layer 400. For example, the total reflection prisms 420 may be arranged on the lower polarizing filter 800. Alternatively, to facilitate arrangement, the brightness enhancement layer 400 may further include a light-pervious substrate 410 arranged to be parallel to the bottom surface of the array substrate, and the bottom surface of each total reflection prism 420 is arranged on the light-pervious substrate 410. During assembly, the surface of the light-pervious substrate 410 on which no total reflection prisms is arranged may be attached to the lower polarizing filter 800. It can be easily understood that on the emergent surface of the display panel, there is also provided an upper polarizing filter 700, the polarization direction of which is perpendicular to that of the lower polarizing filter 800.

To facilitate collecting of light rays emitted by the light-emitting member 510, the reflective surfaces of the total reflection prisms 420 may be configured to be curved surfaces protruding towards the outside of the total reflection prisms 420, as shown in FIGS. 1 and 2. For light rays entering from the incident surfaces of the total reflection prisms 420, the reflective surfaces of the total reflection prisms 420 function as concave mirrors, which can concentrate the light rays and then emit the light as parallel beams. It can thus be seen that, by configuring the reflective surfaces of the total reflection prisms 420 to be curved surfaces protruding towards the outside of the total reflection prisms 420, light rays emitted by the light-emitting members 510 may be further collected, so as to further increase light transmittance of the display panel.

To facilitate touch operation on the liquid crystal display panel, preferably, the liquid crystal display panel comprises a touch unit, at least part of which is arranged on the opposite substrate 200. As the opposite substrate 200 is no longer provided with color resisting blocks, part of the touch unit may be arranged on the opposite substrate 200, thus space utilization of the liquid crystal display panel is increased.

In the present invention, specific type of the touch unit is not specifically defined, and the touch unit may be an embedded touch unit, or may be an add-on touch unit.

In a case that the touch unit is an add-on touch unit, the touch unit may include a touch substrate 900 arranged above the opposite substrate 200. A plurality of first touch electrodes 910 are arranged on the touch substrate 900. A plurality of second touch electrodes 210 are arranged on the opposite substrate 200. The plurality of first touch electrodes 910 and the plurality of second touch electrodes 210 are interlaced with each other.

Capacitances are formed at intersections between the first touch electrodes 910 and the second touch electrodes 210. When an operator's finger touches the touch substrate 900, capacitances between the first touch electrodes 910 and the second touch electrodes 210 are changed, and the position of the touch point may be calculated by difference algorithm using a controller.

In the present invention, a black matrix may be arranged on the opposite substrate, to shield gate lines and data lines on the array substrate. In this case, the first touch electrodes 910 and the second touch electrodes 210 may be made of transparent electrode material (such as ITO).

As a preferable embodiment of the present invention, the number of the first touch electrodes 910 is the same as the number of the gate lines (not shown) on the array substrate 100 and the positions of the first touch electrodes 910 correspond to the positions of the gate lines, and the number of the second touch electrodes 210 is the same as the number of the data lines (not shown) on the array substrate 100 and the positions of the second touch electrodes 210 correspond to the positions of the data lines. After the first touch electrodes 910 and the second touch electrodes 210 are manufactured by using non-transparent material, the first touch electrodes 910 and the second touch electrodes 210 may function as a black matrix to shield the gate lines and the data lines on the array substrate, so that the method for manufacturing the liquid crystal display panel is further simplified.

The brightness of the complementary color light obtained after red light, green light or blue light is filtered out from white light is larger than that of light of a single color (for example, the brightness of the complementary color light to red light is larger than that of red light generated after white light passes through a red color resisting block, the brightness of the complementary color light to green light is larger than that of green light generated after white light passes through a green color resisting block, and the brightness of the complementary color light to blue light is also larger than that of blue light generated after white light passes through a blue color resisting block). Thus, the liquid crystal display panel provided by the present invention has relatively high light transmittance.

In the liquid crystal display panel provided by the present invention, there is no need to provide color resisting blocks of various colors on the opposite substrate, and therefore, the liquid crystal display panel provided by the present invention is easy to manufacture.

It can be understood that the above embodiments are only exemplary embodiments for illustrating the principle of the present invention; however, the present invention is not limited thereto. Various variations and improvements can be made by a skilled in the art without departing from the spirit and essence of the present invention, and these variations and improvements should also be considered to be within the protection scope of the present invention.

The invention claimed is:

1. A liquid crystal display panel comprising an array substrate, an opposite substrate and a backlight module, wherein the liquid crystal display panel includes a light-filtering layer arranged between the backlight module and the array substrate, the light-filtering layer includes a plurality of light-filtering sub-units corresponding in a one-to-one manner to sub-pixels on the array substrate, every three of the light-filtering sub-units form one light-filtering unit in which the three light-filtering sub-units are capable of filtering out red light, green light and blue light from light emitted by the backlight module, respectively.

2. The liquid crystal display panel according to claim 1, wherein the light-filtering layer includes a first transflective layer, a second transflective layer and a third transflective layer which are laminated one by one,
    wherein the first transflective layer includes first transflective lens films and transparent films, the second transflective layer includes second transflective lens films and transparent films, and the third transflective layer includes third transflective lens films and transparent films, and
    wherein based on color light to be filtered out by each light-filtering sub-unit, one of the first to third transflective lens films is arranged in an area corresponding to respective light-filtering sub-unit, such that color lights obtained after passing through the light-filtering sub-units are complementary color lights to red, green and blue lights, respectively.

3. The liquid crystal display panel according to claim 2, wherein the first transflective lens films are capable of reflecting light of a first color of red, green and blue and transmitting lights of other colors than the first color, the second transflective lens films are capable of reflecting light of a second color of red, green and blue and transmitting lights of other colors than the second color, and the third transflective lens films are capable of reflecting light of a third color of red, green and blue and transmitting lights of other colors than the third color.

4. The liquid crystal display panel according to claim 2, wherein the backlight module includes a brightness enhancement layer arranged between the backlight module and the light-filtering layer, a light-emitting member of the backlight module is arranged on one side of the backlight module, and the brightness enhancement layer includes a plurality of total reflection prisms, bottom surfaces of which are arranged to be parallel to the bottom surface of the array substrate, and vertex angles of which protrude towards the backlight module.

5. The liquid crystal display panel according to claim 4, wherein the brightness enhancement layer further comprises a light-pervious substrate arranged to be parallel to the bottom surface of the array substrate, and the bottom surface of each total reflection prism is arranged on the light-pervious substrate.

6. The liquid crystal display panel according to claim 5, wherein a side surface of the total reflection prism facing the light-emitting member of the backlight module is an incident surface, a side surface connecting the incident surface and the bottom surface is a reflective surface, and the reflective surface of the total reflection prism is a curved surface protruding towards the outside of the total reflection prism.

7. The liquid crystal display panel according to claim 2, wherein the liquid crystal display panel includes a touch unit, at least part of which is arranged on the opposite substrate.

8. The liquid crystal display panel according to claim 7, wherein the touch unit includes a touch substrate arranged above the opposite substrate, a plurality of first touch electrodes are arranged on the touch substrate, a plurality of second touch electrodes are arranged on the opposite substrate, and the plurality of first touch electrodes and the plurality of second touch electrodes are interlaced with each other.

9. The liquid crystal display panel according to claim 8, wherein the number of the first touch electrodes is the same as the number of gate lines on the array substrate and positions of the first touch electrodes correspond to positions of the gate lines; and the number of the second touch electrodes is the same as the number of data lines on the array substrate and positions of the second touch electrodes correspond to positions of the data lines.

10. The liquid crystal display panel according to claim 8, wherein the first touch electrodes and the second touch electrodes are made of non-transparent metal material.

11. The liquid crystal display panel according to claim 8, wherein the first touch electrodes and the second touch electrodes are made of transparent electrode material.

12. The liquid crystal display panel according to claim 1, wherein the backlight module includes a brightness enhancement layer arranged between the backlight module and the light-filtering layer, a light-emitting member of the backlight module is arranged on one side of the backlight module, and the brightness enhancement layer includes a plurality of total reflection prisms, bottom surfaces of which are arranged to be parallel to the bottom surface of the array substrate, and vertex angles of which protrude towards the backlight module.

13. The liquid crystal display panel according to claim 12, wherein the brightness enhancement layer further comprises a light-pervious substrate arranged to be parallel to the bottom surface of the array substrate, and the bottom surface of each total reflection prism is arranged on the light-pervious substrate.

14. The liquid crystal display panel according to claim 13, wherein a side surface of the total reflection prism facing the light-emitting member of the backlight module is an incident surface, a side surface connecting the incident surface and the bottom surface is a reflective surface, and the reflective surface of the total reflection prism is a curved surface protruding towards the outside of the total reflection prism.

15. The liquid crystal display panel according to claim 1, wherein the liquid crystal display panel includes a touch unit, at least part of which is arranged on the opposite substrate.

16. The liquid crystal display panel according to claim 15, wherein the touch unit includes a touch substrate arranged above the opposite substrate, a plurality of first touch electrodes being arranged on the touch substrate, a plurality of second touch electrodes being arranged on the opposite substrate, and the plurality of first touch electrodes and the plurality of second touch electrodes being interlaced with each other.

17. The liquid crystal display panel according to claim 16, wherein the number of the first touch electrodes is the same as the number of gate lines on the array substrate and positions of the first touch electrodes correspond to positions of the gate lines; and the number of the second touch electrodes is the same as the number of data lines on the array substrate and positions of the second touch electrodes correspond to positions of the data lines.

18. The liquid crystal display panel according to claim 16, wherein the first touch electrodes and the second touch electrodes are made of non-transparent metal material.

19. The liquid crystal display panel according to claim 16, wherein the first touch electrodes and the second touch electrodes are made of transparent electrode material.

\* \* \* \* \*